(12) United States Patent
Kikuchi et al.

(10) Patent No.: US 12,436,753 B2
(45) Date of Patent: Oct. 7, 2025

(54) SOFTWARE UPDATING DEVICE, IN-VEHICLE TERMINAL, AND SOFTWARE UPDATING SYSTEM

(71) Applicant: Nissan Motor Co., Ltd., Yokohama (JP)

(72) Inventors: Mitsuhiko Kikuchi, Kanagawa (JP); Eisuke Ohashi, Kanagawa (JP); Yoshimori Shizuka, Kanagawa (JP); Yohei Kaieda, Kanagawa (JP); Hidetoshi Hayashi, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 142 days.

(21) Appl. No.: 18/259,595

(22) PCT Filed: Jan. 28, 2021

(86) PCT No.: PCT/JP2021/002961
§ 371 (c)(1),
(2) Date: Jun. 28, 2023

(87) PCT Pub. No.: WO2022/162815
PCT Pub. Date: Aug. 4, 2022

(65) Prior Publication Data
US 2024/0061671 A1  Feb. 22, 2024

(51) Int. Cl.
*G06F 8/65* (2018.01)
*G07C 5/00* (2006.01)

(52) U.S. Cl.
CPC .............. *G06F 8/65* (2013.01); *G07C 5/008* (2013.01)

(58) Field of Classification Search
None
See application file for complete search history.

(56) References Cited

U.S. PATENT DOCUMENTS

| | | | | |
|---|---|---|---|---|
| 2012/0054733 A1* | 3/2012 | Vidal | ......................... | G06F 8/65 717/176 |
| 2012/0084767 A1* | 4/2012 | Ishimoto | ................... | G06F 8/65 717/173 |

(Continued)

FOREIGN PATENT DOCUMENTS

| | | |
|---|---|---|
| JP | H11-27749 A | 1/1999 |
| JP | 2014-21914 A | 2/2014 |

(Continued)

OTHER PUBLICATIONS

Teraoka et al., "A Study of OTA Update Control Method for Vehicle System Using Lightweight Script Language", Consumer Devices & Systems, Oct. 2018, pp. 32-42, vol. 8 No. 3, Information Processing Society of Japan, Tokyo Japan.

(Continued)

*Primary Examiner* — Qing Chen
(74) *Attorney, Agent, or Firm* — Global IP Counselors LLP; David Tarnoff

(57) ABSTRACT

A software updating device includes a controller and a storage device. The software updating device uses software update data of a vehicle for updating the software. The storage device stores a common package including at least the update data, and an identification package including common package identification information assigned to the common package and vehicle identification information that is associated with the common package identification information and that identifies the vehicle. The controller transmits, to a target vehicle subject to software update, the identification package including the vehicle identification information associated with the target vehicle, and transmits, to the target vehicle in accordance with a request from the target vehicle, the common package to which is assigned the (Continued)

common package identification information included in the identification package.

9 Claims, 8 Drawing Sheets

(56) References Cited

U.S. PATENT DOCUMENTS

2017/0109152 A1* 4/2017 Pissey .................. G06F 8/654
2022/0078077 A1* 3/2022 Mifsud ............... G06F 9/45533

FOREIGN PATENT DOCUMENTS

| JP | 2015-162179 A | 9/2015 |
| JP | 2019-101706 A | 6/2019 |

OTHER PUBLICATIONS

Extended European Search Report of Feb. 27, 2024 of corresponding European Patent Application No. 21921666.0.

* cited by examiner

| CAMPAIGN ID | TARGET VIN | TARGET ECU | SOFTWARE VERSION | LINK TO COMMON PACKAGE | COMMON PACKAGE IDENTIFIER |
|---|---|---|---|---|---|
| 1 | 100-199 | ECM | Ver. 2 | PKG01.zip | HASH VALUE |
| 2 | 200-299 | GW | Ver. 5 | PKG02.zip | HASH VALUE |
| 3 | 100-199 | ECM | Ver. 3 | PKG03.zip | HASH VALUE |

FIG. 2

SOFTWARE UPDATING DEVICE, IN-VEHICLE TERMINAL, AND SOFTWARE UPDATING SYSTEM

CROSS-REFERENCE TO RELATED APPLICATIONS

This application is a U.S. national stage application of International Application No. PCT/JP2021/002961, filed on Jan. 28, 2021.

BACKGROUND

Technical Field

The present invention relates to a software updating device, an in-vehicle terminal, and a software updating system.

Background Information

In a maintenance system for maintaining software of an in-vehicle terminal devices of vehicles, a technology is known in which an information center selects, based on installed software/hardware information on the vehicle side, target software that is a candidate for version upgrade and transmits the selected target software to the vehicles (Japanese Laid-Open Patent Application No. 11-027749—Patent Document 1).

In the technology disclosed in Patent Document 1, a demonstration image showing the functions realized by the target software is displayed to the user on the vehicle side, and the user decides whether to accept the target software upgrade. If the user then chooses to accept the target software upgrade, the in-vehicle terminal devices request that the information center transmit the target software, and the information center transmits the target software to the in-vehicle terminal devices.

SUMMARY

In the technology of Patent Document 1, a server that functions as the information center stores the target software and transmits the target software to the in-vehicle terminal devices. In the case that software updates are prepared for each vehicle, there is the problem that the number of processing steps to be executed by the server to update the software stored in the in-vehicle terminal devices of each vehicle and the capacity of the storage device of the server will be increased.

The problem to be solved by the present invention is to provide a software updating device, an in-vehicle terminal device, and a software updating system with which the server processing load and storage capacity can be reduced in a process of updating vehicle software.

The present invention solves the problem described above by means of a software updating device that uses software update data of a vehicle to update software, comprising a storage device that stores a common package including at least the update data, and an identification package including common package identification information assigned to the common package and vehicle identification information that is associated with the common package identification information and that identifies the vehicle, wherein the identification package including the vehicle identification information associated with the target vehicle that is subject to the software update is transmitted to the target vehicle, and the common package to which is assigned the common package identification information included in the identification package is transmitted to the target vehicle in accordance with a request from the target vehicle.

By means of the present invention, in the processing of vehicle software updates, the storage capacity of the server and the processing load on the server can be reduced.

BRIEF DESCRIPTION OF THE DRAWINGS

Referring now to the attached drawings which form a part of this original disclosure.

FIG. 2 shows an example of a software update list according to the present embodiment.

DETAILED DESCRIPTION OF EMBODIMENTS

Figure 1:
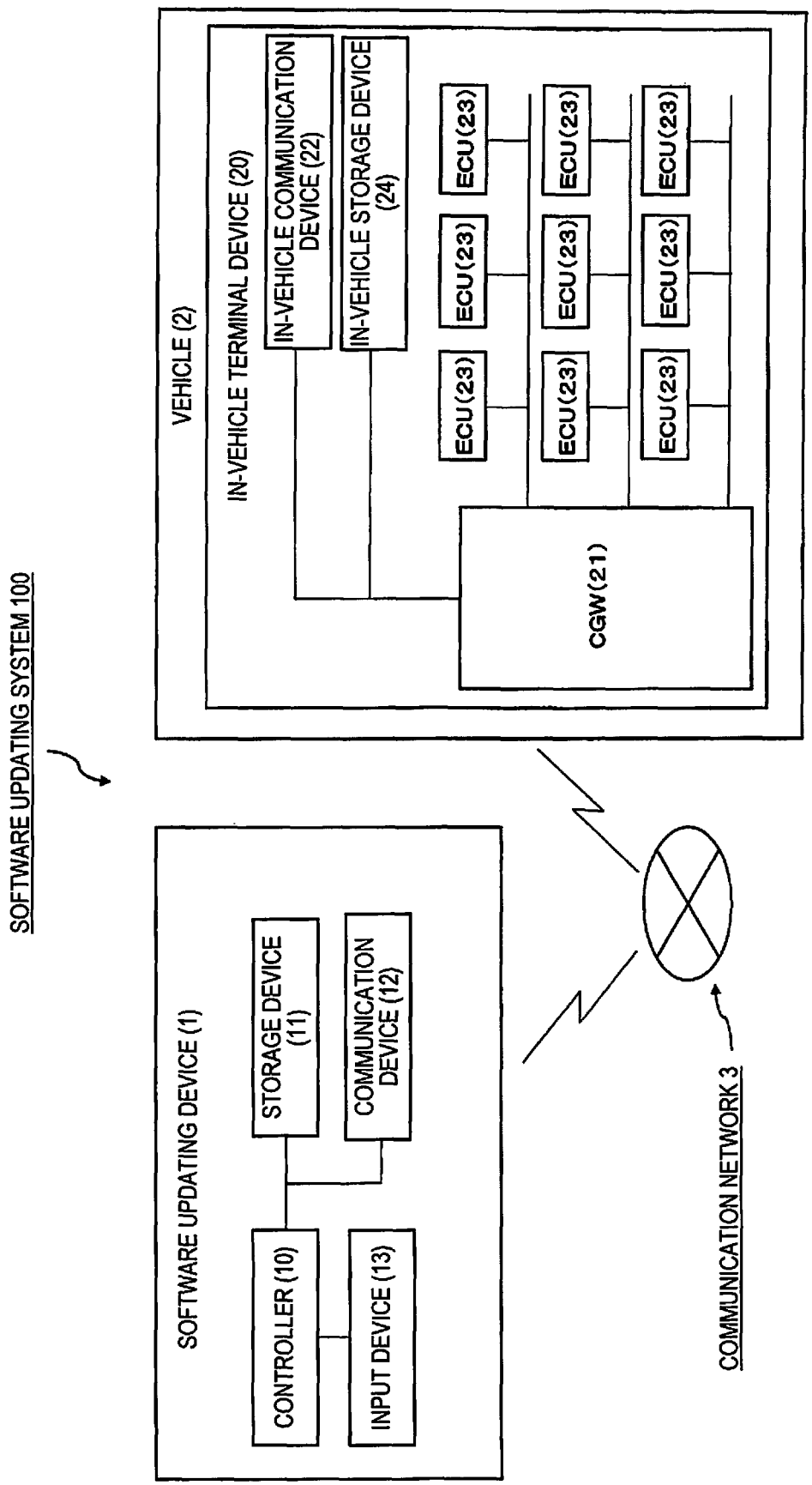
FIG. 1 shows a diagram of an example of the configuration of a software updating system according to the present embodiment.

An embodiment of the system according to the present invention will be described with reference to the drawings. The configuration of a software updating system for updating the software of an ECU (Electronic Control Unit) of a vehicle according to the present embodiment will be described with reference to FIG. 1. FIG. 1 is a block diagram showing an example of a software updating system 100, comprising a software updating device 1, an in-vehicle terminal device 20 mounted on a vehicle 2, and a communication network 3 according to the present embodiment. The software updating system 100 is a FOTA (Firmware Over The Air) system that can update the software of the ECU installed in the vehicle 2 by means of OTA (Over The Air). The software updating device 1 and the in-vehicle terminal device 20 can transmit and receive data to and from each other via the communication network 3. When a software supplier inputs update data for overwriting the software, the software updating device 1 stores the update data. Then, when there is a request for the software update data from the in-vehicle terminal device 20, the software updating device 1 transmits a distribution package that includes the update data to the in-vehicle terminal device 20 that made the request via the communication network 3. Upon receiving the distribution package from the software updating device 1, the in-vehicle terminal device 20 uses the update data included in the distribution package to overwrite and update the software of the ECU to be updated. The communication network 3 is configured to include the Internet, a mobile communication network such as a 4G line, or the like. The update data of the software are update program data for updating the software of the ECU of the vehicle 2 provided by the software supplier. The update data may be all data corresponding to the entire software after the update or differential data corresponding to the difference between the pre- and post-update software. Further, the update data may be compressed by means of a known data compression technology.

In an OTA software update, in order to prevent a software update not intended by the software supplier from the standpoint of cyber security, the software update data received by the vehicle may be ensured to be data for updating its own software. An example of a method for ensuring that the update data are data for updating the software of the target vehicle is a method in which the update data and vehicle identification information for identifying the vehicle to be updated are included in the distribution package, and the distribution package is transmitted to the vehicle to be updated. In this case, a vehicle that receives the distribution package compares a vehicle identification number included in the distribution package with its own vehicle identification number, thereby confirming that the update data included in the distribution package are data for updating its own software. However, the data structure of the distribution package is a structure in which vehicle identification information and update data are stored in association with each other, so that, if there is a plurality of target vehicles, there are a number of pieces of vehicle identification information corresponding to the number of vehicles, and update data are stored in accordance with each piece of vehicle identification information; therefore, the same number of distribution packages as the number of vehicles is required. Then, since the data size of the update data is greater than that of the vehicle identification information, preparing and storing the same number of distribution packages that include update data as the number of vehicles requires a large storage capacity. Further, all of the target vehicles are subjected to a software update, so that the required number of processing steps also increases.

In contrast, in the present embodiment, the software updating device 1 divides the distribution packages into two types and transmits them to the in-vehicle terminal device 20. Specifically, the software updating device 1 uses a common package that includes update data in common among a plurality of vehicles. Further, for each vehicle to be updated, the software updating device 1 prepares an identification package that includes vehicle identification information and common package identification information as information for determining whether the common package represents data for updating the software of the target vehicles. That is, in the present embodiment, instead of preparing packages that include update data of large data size in accordance with the number of vehicles, the relevant package of large data size is prepared as data common to all vehicles to be updated, and packages containing vehicle identification information and common package identification information of small data size are prepared in accordance with the number of vehicles. This allows the vehicle 2 to use the package containing the vehicle identification number to confirm that the update data is for updating its own software, thereby enhancing cyber security while reducing the storage capacity and processing steps for the software update. A more detailed description will be given below.

The software updating device 1 is a server that manages the software update data provided by the software supplier and transmits the update data to the vehicle to be updated. The software updating device 1 comprises a controller 10, a storage device 11, a communication device 12, and an input device 13, which are configured to be able to carry out data communication with each other. The controller 10 in the present embodiment comprises a computer provided with hardware and software, and this computer includes ROM (Read-Only Memory) in which programs are stored, a CPU (Central Processing Unit) that executes the programs stored in the ROM, and RAM (Random-Access Memory) that functions as an accessible storage device.

The controller 10 manages a software update list and updates the software update list that manages the update data when software update data is input from the software supplier. Further, the controller 10 generates a common package (described in detail below) including the input update data, and stores the generated common package in the storage device 11. As shown in FIG. 2, for example, the software update list manages, for each software update campaign, a campaign ID, a target VIN, a target ECU, a software version of the updated software, a link to the common package, and a common package identifier. When update data are to be input, the update data are managed for each campaign of the input update data. Campaign means a unit of information for managing the input update data in association with information, etc., concerning one or more vehicles to be updated. The target VIN is the vehicle identification number (abbreviated as VIN) of the vehicle to be updated. The target ECU is the ECU that is to receive the software update. A software update campaign is not limited to a case in which the target ECU is a single ECU; if there are a plurality of target ECUs, the plurality of ECUs may be assigned as the target ECU. The software version is the version of updated software distributed to the in-vehicle terminal device 20. When update data from the software supplier is input to the controller 10, the controller assigns a campaign ID to the software update campaign. A campaign ID is an identification number that is assigned to identify a software update campaign. The controller 10 also stores the generated common package in the storage device 11 and inputs a link to the storage destination into the software update list as a link to the common package. A common package identifier is identification information for identifying the common package. The controller 10 inputs the common package identifier generated for each common package into the software update list. The controller 10 stores the generated software update list in the storage device 11.

The controller 10 determines whether a software update is necessary for all vehicles under management. Specifically, the controller 10 first, compares the vehicle identification number of each vehicle and the target VIN managed as the target of the software update, and determines whether the vehicle identification numbers match. If the vehicle identification numbers match, the controller 10 compares the current ECU software version of the vehicle with the matching vehicle identification number, and the software version of the updated software. Then, if the current ECU software version of the vehicle is an older software version than the software version of the updated software, the controller 10 determines than a software update is necessary.

Figure 3A:
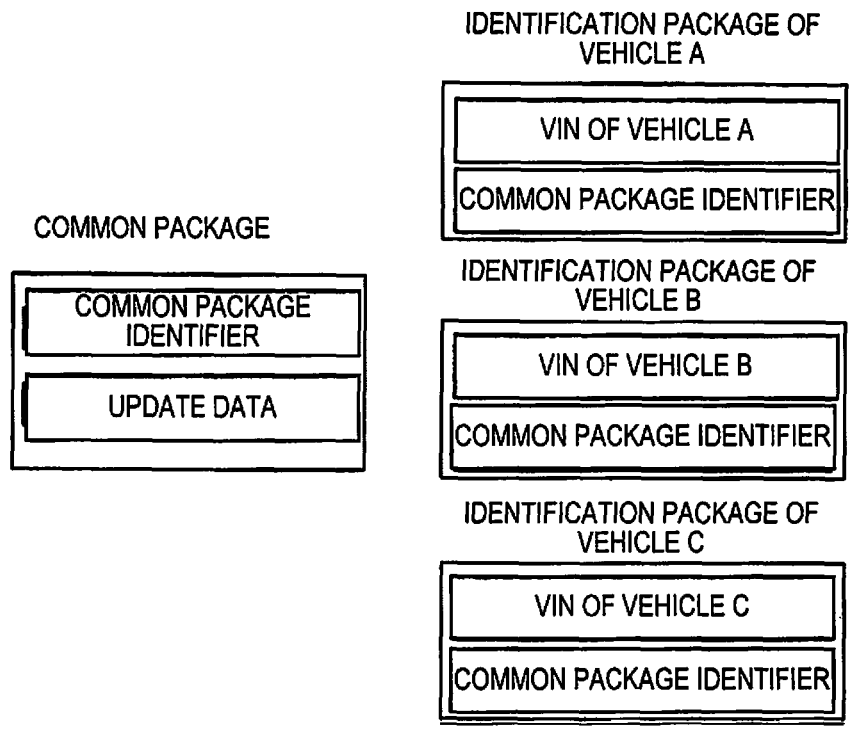
FIG. 3A shows a diagram of the relationship between a common package and an identification package.

If the controller 10 determines that a software update is necessary, an identification package is generated for each vehicle for which it has been determined that a software update is necessary, and the generated identification package is transmitted to the in-vehicle terminal device 20 of given the vehicle. If there is more than one target vehicle, the controller 10 generates a different identification package for each of the plurality of target vehicles. The identification package includes, for each target vehicle, the vehicle identification information corresponding to the target vehicle, and a common package identifier that is assigned to the common package that is used to identify the common package. The identification package is data for the in-vehicle terminal device 20 to determine whether the common package is data for updating the software of its own vehicle. For example, the identification package includes a vehicle identification number (VIN) as vehicle identification information. FIG. 3A is a diagram showing the relationship between a common package and an identification package. The common package includes update data and a common package identifier, as described further below. If the vehicles to be updated are vehicle A, vehicle B, and vehicle C, an identification package for vehicle A, an identification package for vehicle B, and identification package for vehicle C are generated as identification packages. Each identification package includes each vehicle's VIN and the same common package identifier common to the plurality of vehicles. Each vehicle VIN is associated with a common package identifier. Specifically, the VIN of each vehicle is the VIN of the vehicle subject to software update using the update data included in the common package. The common package identifier included in the identification package and the common package identifier included in the common package are identical. In addition, if the vehicle to be updated is identified by vehicle type, the vehicle identification information may be information concerning the vehicle type of the vehicle. In the present embodiment, the in-vehicle terminal device 20 that has acquired the identification package compares the vehicle identification number included in the identification package with its own vehicle identification number to determine whether the vehicle identification number included in the identification package and its own vehicle identification number match, thereby confirming that the update data are data for updating its own software. If the vehicle identification numbers match, the in-vehicle terminal device 20 can confirm that the common package corresponding to the common package identifier included in the identification package is the package for its own vehicle.

Further, the common package identifier is identification information that identifies the common package and is used for the in-vehicle terminal device 20 to authenticate that the common package transmitted to the in-vehicle terminal device 20 is data requested by the in-vehicle terminal device 20. The common package identifier is, for example, a hash value generated from the common package using a hash function. Specifically, the common package identifier is generated from data contained in the common package. For example, the common package identifier is generated by calculating a hash value from the update data. In the present embodiment, a common calculation formula for calculating the hash value is implemented in the software updating device 1 and the in-vehicle terminal device 20. The software updating device 1 and the in-vehicle terminal device 20 then separately calculate the hash value. The calculation of the hash value is executed using various types of calculation formulas, for example, checksum, CRC, ND5, SHA-1, etc. The common package identifier may be prescribed value, such as a campaign ID assigned to a campaign. In the present embodiment, the identification package does not include the update data itself. The data size of the VIN included in the identification package is 17 bytes; thus, the VIN has a small amount of data. That is, the identification package does not include data of large size but data of small size. Therefore, compared to a case in which a package including the software itself and vehicle identification information for identifying the target vehicle is generated and stored for each vehicle, the processing man-hours required for updating the software in the controller 10 and the storage capacity of the storage device 11 can be reduced.

The controller 10 may also generate an identifier using the vehicle identification number of the vehicle 2 to be updated as the common package identifier included in the identification package. For example, the controller 10 includes the value obtained by adding the vehicle identification number of the vehicle 2 to the hash value generated from the common package in the identification package as a common package identifier. In this case, the vehicle 2 that has acquired an identification package can subtract its own vehicle identification number from the common package identifier (the value obtained by adding the vehicle identification number to the hash value) included in the identification package, thereby calculating the hash value generated from the common package. The controller 10 may also use an arithmetic formula in which the "common package identifier"=f (hash value of the common package, VIN) and "common package hash value=g ("common package identifier", VIN)." The software updating device 1 uses the VIN and the hash value of the common package to calculate the common package identifier by means of the calculation formula described above and transmits the calculated common package identifier to the vehicle 2. The vehicle 2 then uses the common package identifier and the VIN to calculate the hash value of the common package by means of the calculation formula described above.

Figure 3B:
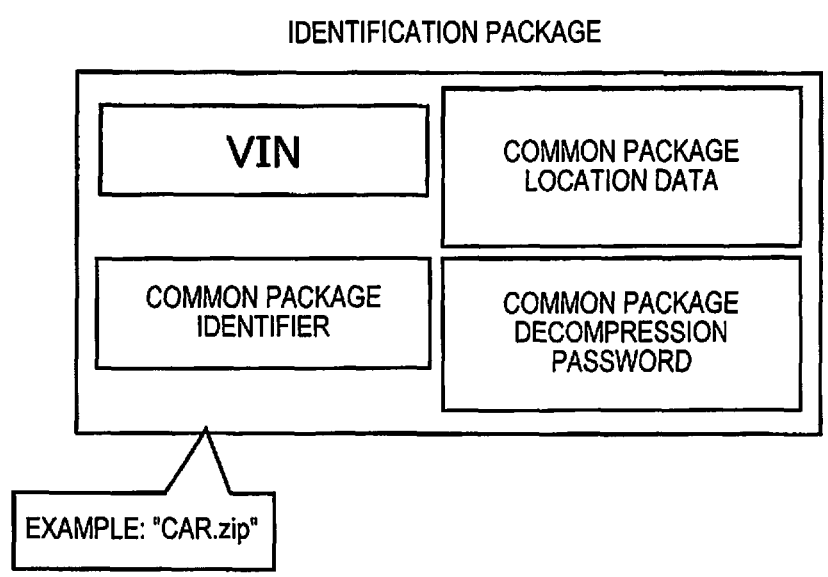
FIG. 3B shows an example of the identification package according to the present embodiment.

The controller 10 may also generate an identification package including additional data, in addition to the vehicle identification number and the common package identifier. As shown in FIG. 3B, additional data included in the identification package are, for example, the location data of the common package and the decompression password for the common package. The location data of the common package are, for example, the URL of a server on which the common package is stored. It can thus be ensured that the in-vehicle terminal device 20 that has acquired the identification package acquires a common package from an appropriate storage server. The decompression password for the common package is the password for decompressing the compressed common package. The controller 10 may also include in the identification package a common key for encrypting and decrypting data contained in the identification package. For example, the vehicle identification number may be used as the common key. Further, a key for encrypting and decrypting data is not limited to a common key and may be a public key used in public key cryptography. The controller 10 may include a password in the identification package for downloading the common package or a password for encrypting the communication path between the software updating device 1 and the in-vehicle terminal device 20. The controller 10 may also encrypt the identification package and transmit the encrypted identification package to the in-vehicle terminal device 20. The in-vehicle terminal device 20 decrypts the encrypted identification package, thereby acquiring the data contained in the identification package. It is thus possible to increase the cyber security of the identification package.

After transmitting the identification package to the in-vehicle terminal device 20, the controller 10 receives a request signal requesting acquisition of the common package from the in-vehicle terminal device 20. When the request signal is received from the in-vehicle terminal device 20, the controller 10 transmits the common package including the common package identifier specified in the request signal to the in-vehicle terminal device 20. The common package is a package that includes the update data and the common package identifier. The common package is a package generated for each software update campaign. That is, if there is a plurality of vehicles to be updated in the campaign, the common package is a package common to the plurality of vehicles to be updated. For example, if there are a million vehicles to which the update data are to be applied in a campaign, the controller 10 prepares a common package commonly used by the million vehicles and transmits the same common package to each vehicle. In addition, the common package identifier is the same as the common package identifier included in the identification package. In the present embodiment, the controller 10 generates a common package when there is input of update data from the software supplier. The controller 10 stores the generated common package in the storage device 11.

Figure 4A:
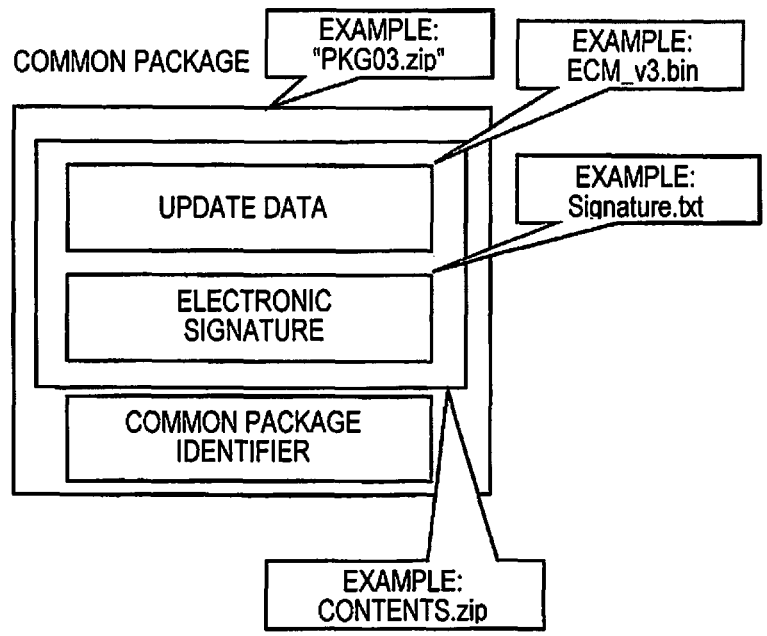
FIG. 4A shows an example of the common package according to the present embodiment.
Figure 4B:
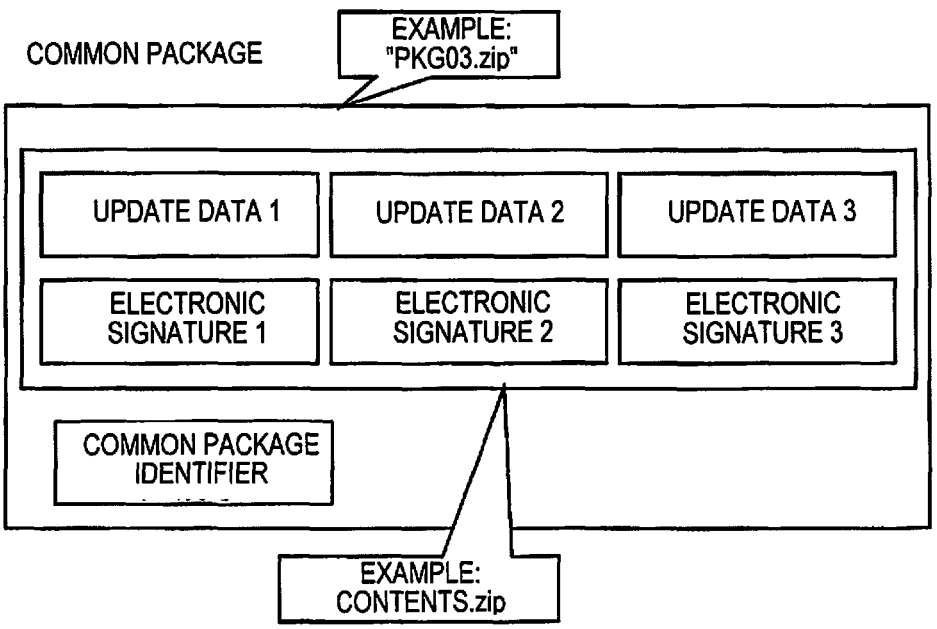
FIG. 4B shows an example of the common package according to the present embodiment.

In addition to the update data, the common package may include ancillary data. Ancillary data may include the software version of the updated software and an electronic signature. Electronic signatures are used to authenticate the integrity of the update data, that is, that it has not been falsified, contains no garbled characters, etc. An electronic signature is, for example, a hash value calculated from the update data that has been encrypted. FIG. 4A is a diagram showing an example of a common package. In FIG. 4A, the common package (PKG03.zip) includes a common package identifier in addition to a file (CONTENTS.zip) including update data (ECM_v3.bin) and an electronic signature (Signature.txt). The common package identifier is a hash value calculated from a file (CONTENTS.zip) in which the update data (ECM_v3.bin) and the electronic signature (Signature.txt) are combined in an archive format such as zip or tar. In addition, the common package identifier may be prescribed value, such as a campaign ID. Also, as shown in FIG. 4B, when the software of a plurality of ECUs is to be updated in a campaign, the common package identifier may be generated by calculating a hash value from a file (CONTENTS.zip) in which a plurality of pieces of update data (update data 1, update data 2, and update data 3) and the electronic signatures (electronic signature 1, electronic signature 2, and electronic signature 3) of the plurality of pieces of update data are combined. Additionally, in the case that the identifier of the common package is a prescribed value, such as the campaign ID, the common package may include a file (CONTENTS.zip) in which a plurality of pieces of update data and the electronic signatures of the plurality of pieces of update data are combined, and a campaign ID serving as the identifier of the common package corresponding to the file.

Figure 5A:
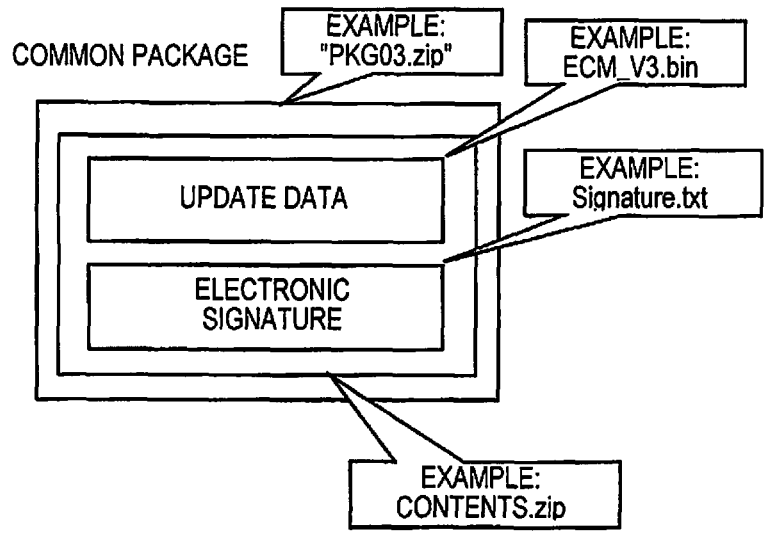
FIG. 5A shows an example of the common package according to the present embodiment.
Figure 5B:
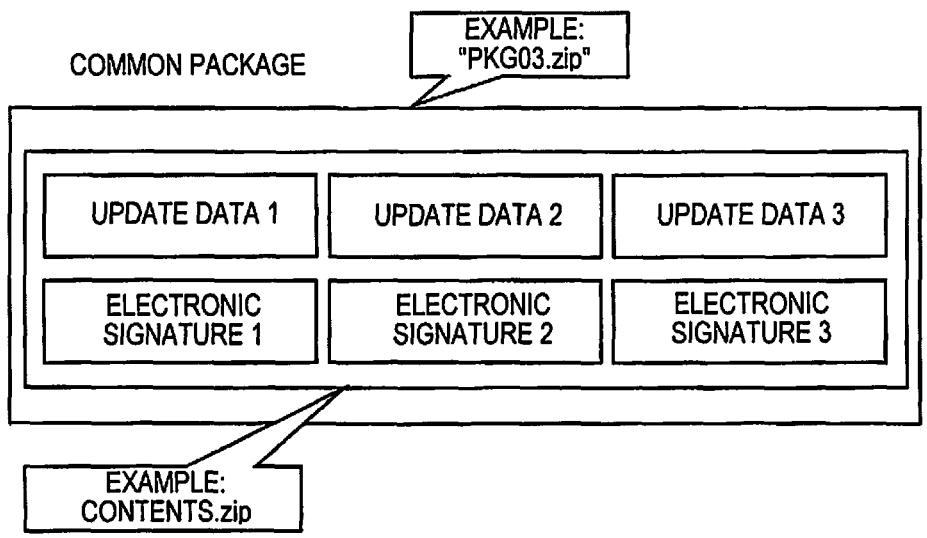
FIG. 5B shows an example of the common package according to the present embodiment.

Also, the common package identifier may not include a common package identifier. In this case, the in-vehicle terminal device 20 that has received a common package calculates a hash value from the common package using a hash function and acquires the calculated hash value as the common package identifier. FIG. 5A is a diagram showing an example of a common package. In FIG. 5A, the common package is shown as a file (PKG03.zip) that combines update data (ECM_v3.bin) and an electronic signature (Signature.txt). In addition, in FIG. 5B, in the case that there is a plurality of pieces of update data in a campaign, the common package is shown as a file (PKG03.zip) that combines a plurality of pieces of update data (update data 1, update data 2, and update data 3) and the electronic signatures (electronic signature 1, electronic signature 2, and electronic signature 3) corresponding to each of the pieces of update data. In this case as well, the in-vehicle terminal device 20 that has received a common package calculates a hash value from the common package using a hash function and acquires the calculated hash value as the common package identifier.

The storage device 11 stores various data relating to software update of the ECU of the vehicle 2. Specifically, the storage device 11 stores a common package. In addition, the storage device 11 stores a database that manages a software update list. Further, the storage device 11 may store an identification package. The communication device 12 is connected to the in-vehicle communication device 22 of the in-vehicle terminal device 20 via the communication network 3 and transmits and receive various data. For example, the communication device 12 transmits a common package and an identification package generated by the controller 10 to the in-vehicle communication device 22. The input device 13 accepts data input by the software supplier. Specifically, the input device 13 receives input update data for the software of the vehicle 2. In addition to the update data, the input device 13 also receives ancillary data including the vehicle identification information of the target vehicle to be updated, the target ECU to be updated, and the software version of the updated software. Upon receiving the input update data, the input device 13 outputs the update data to the controller 10.

The in-vehicle terminal device 20 controls the various ECUs installed in the vehicle, and, upon receiving the update data for the software of the ECU from the software updating device 1, the in-vehicle terminal device updates the software of the ECU using the update data. The in-vehicle terminal device 20 has a CGW (Central Gateway) 21, the in-vehicle communication device 22, an ECU 23, and an in-vehicle storage device 24, and is connected such that data communication is possible between the CGW 21 and the in-vehicle communication device 22, and between the CGW 21 and the ECU 23.

The CGW 21 is a vehicle gateway device that has a data relay function, and, upon acquiring update data are acquired from the in-vehicle communication device 22, this vehicle gateway device distributes the update data to the ECU to be updated. First, the CGW 21 determines whether the vehicle identification number included in the identification package received from the software updating device 1 and the vehicle identification number of the host vehicle match. Specifically, the CGW 21 acquires the vehicle identification number of the target vehicle from the in-vehicle storage device 24. Then, when an identification package is received from the software updating device 1 via the in-vehicle communication device 22, the CGW 21 acquires the vehicle identification number from the identification package and compares the vehicle identification number included in the identification package with the target vehicle identification number. Then, the CGW 21 determines whether the vehicle identification number included in the identification package and the vehicle identification number of the target vehicle match. Upon determining the vehicle identification number included in the identification package and the vehicle identification number of the target vehicle match, the CGW 21 transmits a request signal requesting acquisition of a common package to the software updating device 1 via the in-vehicle communication device 22. Specifically, the CGW 21 acquires a common package identifier from the identification package and transmits a request signal requesting acquisition of the common package to which the common package identifier is assigned. As described above, the CGW21 compares the vehicle identification number included in the identification package with the vehicle identification number of the target vehicle, thereby confirming that the information of the identification package is for updating the software of the target vehicle. The CGW 21 can then acquire the common package, which is data for updating the software of the target vehicle, by requesting acquisition of the common package to which the common package identifier included in the identification package is assigned.

Upon receiving the common package from the software updating device 1, the CGW 21 acquires a common package identifier from the common package. For example, in the case that the common package identifier is stored in the common package in the software updating device 1, the CGW 21 acquires the common package identifier stored in the common package. In addition, if the common package identifier is generated by calculating a hash value from the common package, the CGW 21 may calculate a hash value from the acquired common package to acquire the common package identifier. CGW 21 then determines whether the acquired common package identifier and the common package identifier included in the identification package match. Upon determining the acquired common package identifier and the common package identifier included in the identification package match, the CGW 21 then extracts update data from the common package. The CGW 21 then transmits the extracted update data to the ECU to be updated and uses the update data to update the ECU software to be updated. As described above, the CGW 21 can compare the common package identifier acquired from the common package with the common package identifier included in the identification package, thereby confirming that the common package transmitted from the software updating device 1 is the requested common package. In this way, the CGW 21 can prevent software that was not intended to be updated by the software supplier from being updated.

Moreover, the CGW 21 aggregates the software versions of the software of a plurality of the ECUs 23. Specifically, CGW 21 aggregates the software versions of the ECUs at the time that the ignition power of the vehicle 2 is turned on. The CGW 21 also aggregates the ECU software versions at that time at regular intervals. The CGW 21 transmits the aggregated ECU software versions to the software updating device 1 via the in-vehicle communication device 22.

The in-vehicle communication device 22 carries out data communication with the software updating device 1 via the communication network 3, and, upon receiving an identification package and a common package including software from the software updating device 1, the in-vehicle communication device forwards the received identification package and common package to the CGW 21. The in-vehicle communication device 22 may use different communication paths depending on the type of data received. Specifically, in the case of receiving update data from the software updating device 1, the in-vehicle communication device 22 receives the update data via a first communication path for providing software. Further, when receiving other data besides update data, the in-vehicle communication device 22 receives this data other than update data via a second communication path for providing data other than software update data. For example, if an external map data provider provides map data used in the vehicle to the in-vehicle terminal device 20, the in-vehicle communication device 22 receives the map data via the second communication path. The first communication path is a communication path with a higher security level than the second communication path. The security level is a value that is set higher for a communication path that is evaluated to have a lower security risk in a security risk analysis of the communication path.

The ECU 23 includes, for example, body system ECUs, a travel system ECU, and an information system ECU. Body system ECUs are ECUs that control the body system, such as door ECUs that control the locking and unlocking of doors, meter ECUs that control meter displays, an air conditioner ECU that controls the operation of an air conditioner, window ECUs that control the opening and closing of windows. The travel system ECU is an ECU that controls the travel system, such as an engine ECU that controls operation of the engine, a brake ECU that controls the operation of the brakes, a power steering ECU that controls the operation of the power steering. The information system ECU is an ECU that controls the information system, such as a navigation ECU that controls the navigation system and an audio ECU that controls audio equipment. The type of ECU 23 is not limited to those of the illustrated configuration. When update data are acquired from the CGW 21, the ECU 23 uses the update data to update the software. In addition, the ECU 23 manages the software version of the software and transmits the software version in accordance with a request signal from the CGW 21.

The in-vehicle storage device 24 stores various data. In the present embodiment, the in-vehicle storage device 24 stores the vehicle identification number assigned to the host vehicle.

Figure 6:
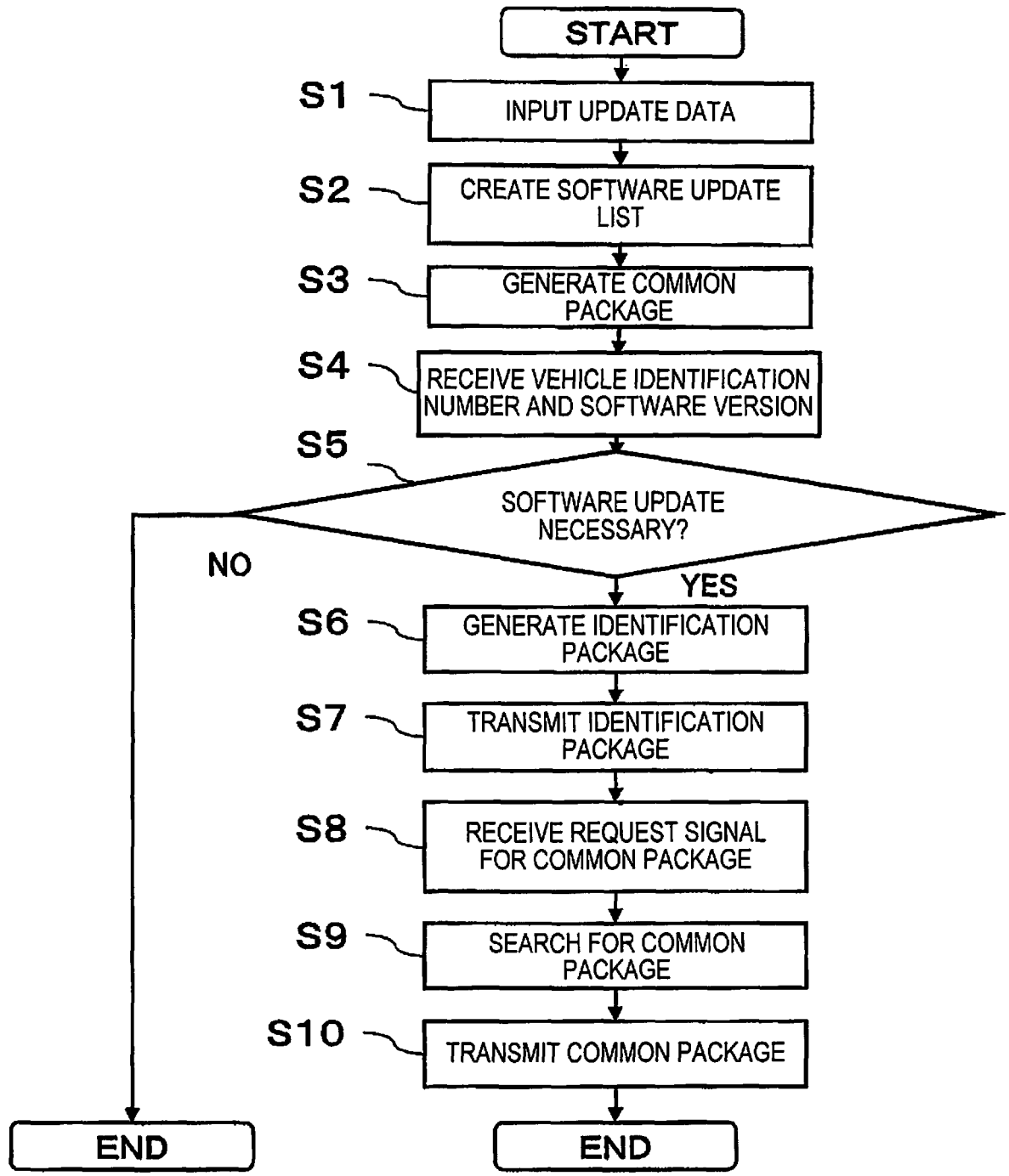
FIG. 6 shows an example of the control flow of a software updating device according to the present embodiment.

A software update control process executed by the software updating device 1 will now be described. FIG. 6 shows the control flow for executing a software update control process in the software updating device 1. In the present embodiment, when the software supplier inputs update data to the input device 13, the control flow starts from Step S1.

In Step S1, the software updating device 1 receives the update data input by the software supplier. In Step S2, the software updating device 1 generates a software update list based on the update data acquired in Step S1. In Step S3, the software updating device 1 generates a common package based on the update data acquired in Step S1. Specifically, the software updating device 1 generates a common package including update data and a common package identifier. The software updating device 1 may generate a common package that includes update data but does not include a common package identifier. In Step S4, the software updating device 1 receives the vehicle identification number of the vehicle 2 and the ECU software version of the vehicle 2 from the in-vehicle terminal device 20. In Step S5, the software updating device 1 determines whether a software update is necessary. Specifically, for each vehicle, the software updating device 1 compares the vehicle identification number acquired from the in-vehicle terminal device 20 and the vehicle identification number of the vehicle to be updated stored in the software update list. The software updating device 1 then determines whether software version of the ECU of the vehicle with the matching vehicle identification number matches the software version of the updated software. Upon determining a software update is necessary, the software updating device 1 proceeds to Step S6. Upon determining a software update is not necessary, the software updating device 1 terminates the control flow. The control of Steps S4-S5 is respectively executed for all vehicles under management.

In Step S6, the software updating device 1 generates an identification package for each vehicle for which a software update is determined to be necessary in Step S5. The identification package includes the vehicle identification number of the vehicle 2 for which a software update is determined to be necessary in Step S5 and the common package identifier of the common package generated in Step S3. In Step S7, the software updating device 1 transmits the identification package generated in Step S6 to the in-vehicle terminal device 20. Specifically, the software updating device 1 transmits the identification package including the vehicle identification number associated with the target vehicle for which the software is to be updated to the in-vehicle terminal device 20 of the target vehicle. In Step S8, the software updating device 1 receives a request signal requesting acquisition of the common package from the in-vehicle terminal device 20. In Step S9, the software updating device 1 searches for a common package to which the common package identifier requested by the in-vehicle terminal device 20 is assigned. Specifically, the software updating device 1 searches for a common package to which the requested common package identifier is assigned from among a plurality of common packages stored in the storage device 11 in accordance with the requested common package identifier. In Step S10, the software updating device 1 transmits the common package retrieved in Step S9 to the in-vehicle terminal device 20. After completing Step S10, the software updating device 1 terminates the control flow. Further, in the present embodiment, the control of Steps S6-S10 is executed for all vehicles that have been determined to require a software update.

Figure 7:
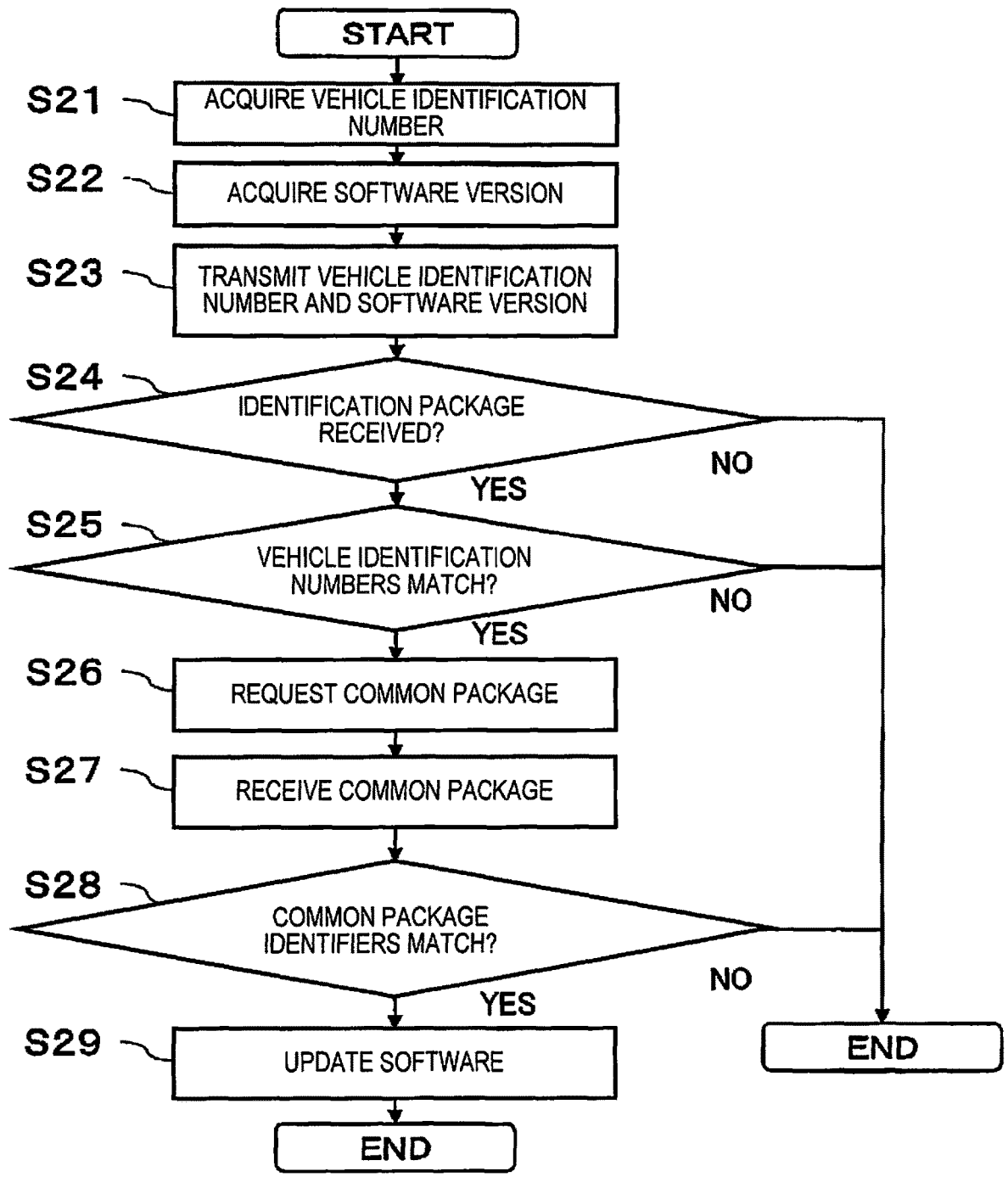
FIG. 7 shows an example of the control flow of an in-vehicle terminal device according to the present embodiment.

The software update control process executed by the in-vehicle terminal device 20 will now be described. FIG. 7 shows a control flow for executing a software update control process in the in-vehicle terminal device 20. In the present embodiment, when the ignition power is turned on, the in-vehicle terminal device 20 starts the control flow from Step S21. The in-vehicle terminal device 20 may start the control flow from Step S21 at regular intervals.

In Step S21, the CGW 21 acquires the vehicle identification number of the host vehicle from the in-vehicle storage device 24. In Step S22, the CGW 21 aggregates the software versions of the ECUs 23 of the vehicle 2. Specifically, the CGW 21 acquires the software versions of the ECUs from all the ECUs 23 installed in the vehicle 2. In Step S23, the CGW 21 transmits the vehicle identification number acquired in Step S21 and the software versions acquired in Step S22 to the software updating device 1. In Step S24, the CGW 21 determines whether an identification package has been received from the software updating device 1. Upon determining an identification package has been received, the CGW 21 proceeds to Step S25. Upon determining an identification package has not been received, the CGW 21 terminates the control flow. In Step S25, the CGW 21 determines whether the vehicle identification numbers match. That is, the CGW 21 compares the vehicle identification number included in the identification package with the vehicle identification number of the host vehicle to determine whether the vehicle identification numbers match. Upon determining the vehicle identification numbers match, the CGW 21 proceeds to Step S26. Upon determining the vehicle identification numbers do not match, the CGW 21 terminates the control flow.

In Step S26, the CGW 21 requests a common package. Specifically, the CGW 21 acquires the common package identifier from the identification package received in Step S24 and transmits to the software updating device 1 a request signal requesting acquisition of the common package to which the common package identifier is assigned. In Step S27, the CGW 21 receives a common package via the in-vehicle communication device 22. In Step S28, the CGW 21 determines whether the common package identifiers match. That is, the CGW 21 compares the common package identifier included in the identification package received in Step S24 with the common package identifier acquired from the common package received in Step S27, thereby determining whether the common package identifiers match. Upon determining the common package identifiers match, the CGW 21 proceeds to Step S29. Upon determining the common package identifiers do not match, the CGW 21 terminates the control flow. In Step S29, the CGW 21 updates the software. Specifically, the in-vehicle terminal device 20 acquires update data from the common package received in Step S27 and uses the update data to update the software of the ECU of the vehicle 2.

Figure 8:
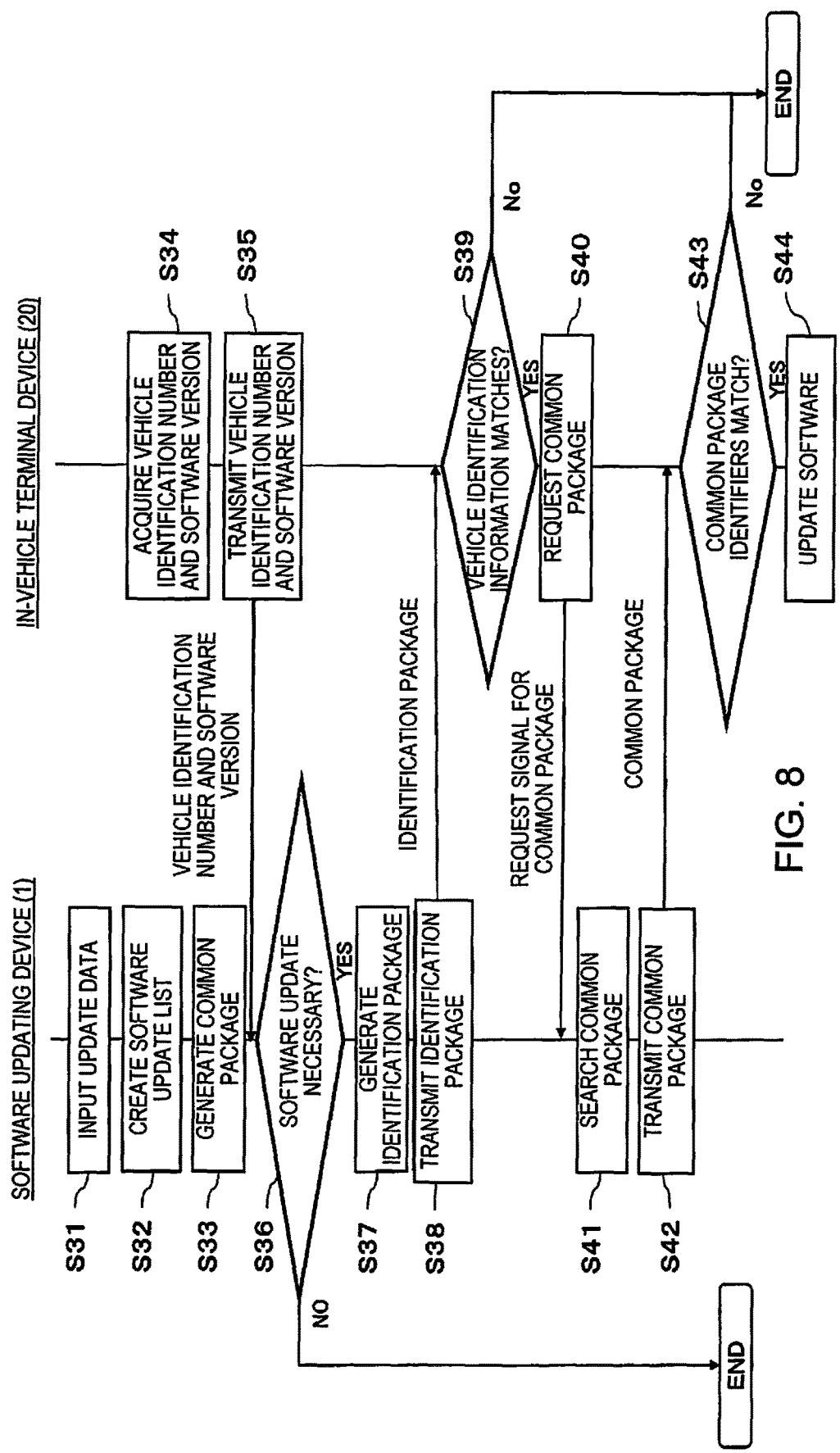
FIG. 8 shows a sequence diagram of the control flow in a software updating system according to the present embodiment.

The software update control process of the software updating system according to the present embodiment will now be described with reference to the flowchart of FIG. 8. FIG. 8 is a sequence diagram of the software update control process in the software updating system. In the present embodiment, when the software supplier inputs software update data to the input device 13, the control flow starts from Step S31.

In Step S31, the software updating device 1 receives the update data input by the software supplier. In Step S32, the software updating device 1 generates a software update list based on update data acquired in Step S1. In Step S33, the software updating device 1 generates a common package based on the update data acquired in Step S31. In Step S34, the in-vehicle terminal device 20 acquires the vehicle identification number of the host vehicle and the software version of each ECU of the host vehicle. In Step S35, the in-vehicle terminal device 20 transmits the vehicle identification number and the software versions acquired in Step S34 to the software updating device 1. In Step S36, the software updating device 1 determines, based on the vehicle identification number received from the in-vehicle terminal device 20 and the software version, whether a software update of the vehicle 2 is necessary. Upon determining a software update is necessary, the software updating device 1 proceeds to Step S37. Upon determining a software update is not necessary, the software updating device 1 terminates the control flow. The control of Steps S34-S36 is executed for all vehicles under management. For example, when the vehicle ignition power is turned on or at regular intervals, the control of Steps S4-S6 is executed.

In Step S37, the software updating device 1 generates an identification package for each of the vehicles 2 for which a software update is determined to be necessary in Step S36. In Step S38, the software updating device 1 transmits the identification package generated in Step S37 to the in-vehicle terminal device 20. In Step S39, the in-vehicle terminal device 20 determines whether the vehicle identification number included in the identification package received in Step S38 matches the vehicle identification number of the host vehicle. Upon determining the vehicle identification numbers match, the in-vehicle terminal device 20 proceeds to Step S40. Upon determining the vehicle identification numbers do not match, the in-vehicle terminal device 20 terminates the control flow. In Step S40, the in-vehicle terminal device 20 transmits a request signal requesting acquisition of the common package to the software updating device 1.

In Step S41, the software updating device 1 searches for the common package requested by the in-vehicle terminal device 20 in Step S40. In Step S42, the software updating device 1 transmits the common package retrieved in Step S41 to the in-vehicle terminal device 20. In Step S43, the in-vehicle terminal device 20 determines whether the common package identifier included in the identification package transmitted in Step S38 matches the common package identifier acquired from the common package transmitted in Step S42. Upon determining the common package identifiers match, the in-vehicle terminal device 20 proceeds to Step S44. Upon determining the common package identifiers do not match, the in-vehicle terminal device 20 terminates the control flow. In Step S44, the in-vehicle terminal device 20 updates the software of the vehicle 2. In the present embodiment, the control of Steps S37-S44 is executed with respect to all vehicles that have been determined to require a software update.

As described above, the present embodiment concerns a software updating device provided outside of a vehicle that uses software update data of the vehicle to update software, comprises a storage device that stores a common package including at least the update data, and an identification package including common package identification information assigned to the common package and vehicle identification information that is associated with the common package identification information and that identifies the vehicle, wherein the identification package including the vehicle identification information associated with a target vehicle that is subject to the software update is transmitted to the target vehicle, and the common package to which is assigned the common package identification information included in the identification package is transmitted to the target vehicle in accordance with a request from the target vehicle. It is thus possible to reduce the server storage capacity and processing load on the server in a process of updating vehicle software.

Further, in the present embodiment, if there is a plurality of target vehicles, an identification package including common package identification information common to the plurality of target vehicles and vehicle identification information assigned to each of the plurality of target vehicles is generated for each of the plurality of target vehicles. As a result, even if there is a plurality of vehicles whose software is to be updated, identification information is generated for each vehicle, so that it is possible to reduce the storage capacity.

Further, in the present embodiment, the same common package is transmitted to a plurality of target vehicles. As a result, even if there is a plurality of vehicles whose software is to be updated, the same common package is transmitted, so that it is possible to reduce the storage capacity.

Further, in the present embodiment, an identification package is generated that includes a hash value generated from the common package using a hash function as common package identification information. This allows the data size of the identification package to be reduced relative to when the entire update data are included.

Further, in the present embodiment, common package identification information is generated based on the vehicle identification information of the target vehicle, and an identification package that includes the generated common package identification information and vehicle identification information is generated. As a result, since only the target vehicle can acquire the identification information for identifying the common package, the strength of cyber security can be increased.

Further, the present embodiment is a vehicle-mounted terminal device of a vehicle that acquires update data of software to be updated from a server provided outside of the vehicle and updates the software of the vehicle, wherein an identification package, stored in the server, that includes common package identification information that includes the update data and that is assigned to each common package stored in the server, and vehicle identification information for identifying the vehicle, associated with the common package identification information, is received from the server, the common package identification information is acquired from the received identification package, the common package to which the acquired common package identification information is assigned is received from the server, and the update data included in the received common package is used, thereby updating the software of the vehicle.

Further, in the present embodiment, a determination is made as to whether the vehicle identification information included in the received identification package and the vehicle identification information assigned to the vehicle match, and upon determining the vehicle identification information match, a determination is made as to whether the common package identification information included in the identification package and the common package identification information acquired from the common package match; and upon determining the common package identification information match, the software is updated. This makes possible a guarantee that that the update data for the vehicle are data for updating its own software.

Further, in the present embodiment, a determination is made as to whether the vehicle identification information included in the received identification package and the vehicle identification information assigned to the vehicle match; upon determining the vehicle identification information match, a request signal requesting acquisition of the common package is transmitted to the server, and the common package is received from the server as a response signal to the request signal. This makes possible a guarantee that that the update data for the vehicle are data for updating its own software.

Further, in the present embodiment, when the update data from the server are acquired, the update data are acquired from the server via a first communication path, and the first communication path is a communication path with higher security level than a second communication path for supplying data other than the update data. It is thus possible to increase the strength of cyber security of the update data.

Further, the present embodiment relates to a software updating system comprising an in-vehicle terminal device installed in a vehicle and a software updating device provided outside of the vehicle that uses software update data of the vehicle to update the software, wherein the software updating device is provided with a storage device that stores a common package that includes at least the update data and an identification package that includes common package identification information assigned to the common package and vehicle identification information that is associated with the common package identification information and that identifies the vehicle, and transmits to the vehicle the identification package that includes the vehicle identification information associated with the vehicle that is subject to the software update and the common package to which is assigned the common package identification information included in the identification package in accordance with a request from the vehicle; and wherein the vehicle receives from the software updating device the identification package that includes the vehicle identification information of the vehicle, acquires the common package identification information from the received identification package, receives the common package to which the acquired common package identification information is assigned from the software updating device, and uses the update data included in the received common package to update the software of the vehicle. It is thus possible to reduce the storage capacity of the server and the processing load on the server in a process of updating vehicle software.

The above-described embodiment is meant to facilitate an understanding of the present invention and is not intended to limit the present invention. Thus, the elements disclosed in the above-described embodiment are intended to include all design modifications and equivalents thereof that fall within the technical scope of the present invention.

The invention claimed is:

1. A software updating device provided outside of a vehicle for updating software using software update data of the vehicle, the software updating device comprising:
   a hardware storage device configured to store a common package including at least the software update data of the vehicle and an identification package that includes common package identification information assigned to the common package and vehicle identification information that is associated with the common package identification information for identifying the vehicle,
   an electronic controller configured to generate a different identification package for each target vehicle of a plurality of target vehicles subject to a software update, and
   an electronic communication device configured to transmit the different identification packages including the vehicle identification information associated with the plurality of target vehicles to the target vehicle,
   the electronic communication device being further configured to receive a request from the target vehicle requesting the common package,
   the electronic communication device being further configured to transmit the common package to which is assigned the common package identification information included in the identification package to the target vehicle in response to the request received from the target vehicle,
   the target vehicle being configured to update the software using the software update data of the vehicle included in the common package, and
   the different identification packages include the common package identification information common to the plurality of target vehicles and the vehicle identification information assigned to each target vehicle of the plurality of target vehicles.

2. The software updating device according to claim 1, wherein the common package is transmitted to the plurality of target vehicles.

3. The software updating device according to claim 1, wherein
   the identification package is generated including a hash value generated from the common package using a hash function as the common package identification information.

4. A software updating device provided outside of a vehicle for updating software using software update data of the vehicle, the software updating device comprising:
   a hardware storage device configured to store a common package including at least the software update data of the vehicle and an identification package that includes common package identification information assigned to the common package and vehicle identification information that is associated with the common package identification information for identifying the vehicle,
   an electronic controller configured to generate the common package identification information based on the vehicle identification information of a target vehicle subject to a software update, and further configured to generate the identification package including the generated common package identification information and the vehicle identification information, and
   an electronic communication device configured to transmit the identification package including the vehicle identification information associated with the target vehicle to the target vehicle,
   the electronic communication device being further configured to receive a request from the target vehicle requesting the common package,
   the electronic communication device being further configured to transmit the common package to which is assigned the common package identification information included in the identification package to the target vehicle in response to the request received from the target vehicle, and
   the target vehicle being configured to update the software using the software update data of the vehicle included in the common package.

5. An in-vehicle terminal device of a vehicle that acquires update data for software to be updated from a server provided outside of the vehicle and updates the software of the vehicle, the in-vehicle terminal device comprising:
   an in-vehicle electronic communication device configured to receive an identification package stored in the server, wherein the received identification package includes common package identification information, which includes the software update data that is assigned to each common package stored in the server, and vehicle identification information, which is associated with the common package identification information for identifying the vehicle, and
   a vehicle electronic gateway device configured to acquire the common package identification information from the received identification package,
   the in-vehicle electronic communication device being further configured to transmit a request to the server for the common package upon determining that vehicle identification information stored in the vehicle matches the vehicle identification information included in the received identification package,
   the common package to which the acquired common package identification information is assigned is received from the server responsive to the request transmitted by the in-vehicle communication device,
   the vehicle electronic gateway device being further configured to use the software update data included in the common package to update the software of the vehicle, and
   the received identification package is generated differently for each vehicle of a plurality of vehicles when the plurality of vehicles are subject to a software update, and includes, for each vehicle of the plurality of vehicles, the common package identification information common to the plurality of vehicles and the vehicle identification information assigned to each vehicle of the plurality of vehicles.

6. The in-vehicle terminal device according to claim 5, wherein
   a determination is made as to whether the vehicle identification information included in the received identification package matches the vehicle identification information assigned to the vehicle, upon determining the vehicle identification information match, a determination is made as to whether the common package identification information included in the received identification package matches the common package identification information acquired from the common package, and upon determining the common package identification information match, the software of the vehicle is updated.

7. The in-vehicle terminal device according to claim 6, wherein a determination is made as to whether the vehicle identification information included in the received identification package matches the vehicle identification information assigned to the vehicle, upon determining the vehicle identification information match, a request signal requesting acquisition of the common package is transmitted to the server, and the common package is received from the server as a response signal to the request signal.

8. The in-vehicle terminal device according to claim 5, wherein when the software update data are acquired from the server, the software update data are acquired from the server via a first communication path, and the first communication path is a communication path with a higher security level than a second communication path for supplying data other than the software update data.

9. A software updating system comprising:

an in-vehicle terminal device installed in a vehicle; and a software updating device provided outside of the vehicle, and software update data of the vehicle is used to update software, the software updating device including:

a hardware storage device configured to store a common package that includes at least the software update data of the vehicle and an identification package that includes common package identification information assigned to the common package and vehicle identification information that is associated with the common package identification information for identifying the vehicle, an electronic controller configured to generate the identification package differently for each vehicle of a plurality of vehicles subject to the software update, and an electronic communication device configured to transmit to each vehicle of the plurality of vehicles the identification package that includes the vehicle identification information associated with each vehicle of the plurality of vehicles, the electronic communication device being further configured to receive a request from each vehicle of the plurality of vehicles requesting the common package, the electronic communication device being further configured to transmit to each vehicle of the plurality of vehicles the common package to which is assigned the common package identification information included in the identification package in response to the request received from the vehicle, and the identification package includes, for each vehicle of the plurality of vehicles, the common package identification information common to the plurality of vehicles and the vehicle identification information assigned to each vehicle of the plurality of vehicles, the in-vehicle terminal device including:

an in-vehicle electronic communication device configured to receive the identification package from the software updating device, wherein the received identification package includes the vehicle identification information of the vehicle, and a vehicle electronic gateway device configured to acquire the common package identification information from the received identification package, wherein the common package to which the acquired common package identification information is assigned is received from the software updating device, the in-vehicle electronic communication device being further configured to transmit a request to the software updating device for the common package upon determining that vehicle identification information stored in the vehicle matches the vehicle identification information included in the received identification package, and the vehicle electronic gateway device being further configured to use the software update data of the vehicle included in the common package to update the software of the vehicle.

\* \* \* \* \*